(12) United States Patent
Otsuki et al.

(10) Patent No.: US 7,695,862 B2
(45) Date of Patent: Apr. 13, 2010

(54) ADDITIVE FOR NON-AQUEOUS ELECTROLYTE SOLUTION OF SECONDARY BATTERY AND NON-AQUEOUS ELECTROLYTE SECONDARY BATTERY

(75) Inventors: Masashi Otsuki, Kodaira (JP); Yasuro Horikawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1282 days.

(21) Appl. No.: 10/540,558

(22) PCT Filed: Dec. 24, 2003

(86) PCT No.: PCT/JP03/16592

§ 371 (c)(1),
(2), (4) Date: Jun. 24, 2005

(87) PCT Pub. No.: WO2004/059782

PCT Pub. Date: Jul. 15, 2004

(65) Prior Publication Data

US 2006/0046151 A1    Mar. 2, 2006

(30) Foreign Application Priority Data

Dec. 26, 2002    (JP) ............................ 2002-377142

(51) Int. Cl.
*H01M 6/04*    (2006.01)
(52) U.S. Cl. .................. 429/199; 429/339; 429/340; 429/341; 429/307; 429/188; 429/314; 429/315; 252/62.2
(58) Field of Classification Search ................ 429/199, 429/339, 340, 341, 307, 188, 314, 315; 252/62.2
See application file for complete search history.

(56) References Cited

U.S. PATENT DOCUMENTS 5,824,433 A * 10/1998 Angell et al. ................ 429/199
6,955,867 B1 * 10/2005 Otsuki et al. ................ 429/314

FOREIGN PATENT DOCUMENTS

| EP | 1 289 044 A1 | 3/2003 |
|---|---|---|
| JP | 06-13108 A | 1/1994 |
| JP | 11-144757 A | 5/1999 |
| JP | 2001-102088 A | 4/2001 |
| JP | 2001-217001 A | 8/2001 |
| JP | 2001-217002 A | 8/2001 |
| JP | 2001-217003 A | 8/2001 |
| JP | 2001-217004 A | 8/2001 |
| JP | 2001-217005 A | 8/2001 |
| JP | 2001-217006 A | 8/2001 |
| JP | 2001-217007 A | 8/2001 |
| JP | 2001-338682 A | 12/2001 |
| JP | 2001-338683 A | 12/2001 |
| JP | 2002-83628 A | 3/2002 |
| JP | 2003-77532 A | 3/2003 |
| WO | WO 01/86746 A | 11/2001 |

OTHER PUBLICATIONS

Patent Abstracts of Japan, vol. 2002, No. 7 corresponds to JP 2002-083628 A, published Mar. 22, 2002 with Abstract.
Patent Abstracts of Japan, vol. 2002, No. 4 dated Aug. 4, 2002 corresponds to JP 2001-338682 A, previously filed on Jun. 24, 2005 with Abstract.
Patent Abstracts of Japan, vol. 2002, No. 4 dated Aug. 4, 2002 corresponds to JP 2001-338683 A, previously filed on Jun. 24, 2005 with Abstract.
Patent Abstracts of Japan, vol. 018, No. 210 dated Apr. 14, 1994 corresponds to JP 6-131108 A, published Jan. 21, 1994 with Abstract.

* cited by examiner

*Primary Examiner*—Laura S Weiner
(74) *Attorney, Agent, or Firm*—Sughrue Mion, PLLC

(57) ABSTRACT

The invention is concerned with an additive for a non-aqueous electrolyte of a secondary battery having a high ability dissolving a support salt and a low viscosity and comprising a phosphazene derivative represented by the following formula (I):

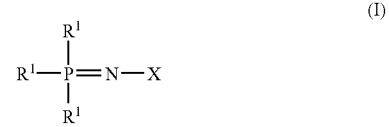

(wherein $R^1$ is independently a halogen element or a monovalent substituent; and X is an organic group containing at least one element selected from the group consisting of carbon, silicon, nitrogen, phosphorus, oxygen and sulfur) as well as a non-aqueous electrolyte secondary battery comprising an electrolyte containing this additive and having excellent high-rate characteristics.

8 Claims, No Drawings

ADDITIVE FOR NON-AQUEOUS ELECTROLYTE SOLUTION OF SECONDARY BATTERY AND NON-AQUEOUS ELECTROLYTE SECONDARY BATTERY

TECHNICAL FIELD

This invention relates to an additive for a non-aqueous electrolyte of a secondary battery and a non-aqueous electrolyte secondary battery obtained by adding the additive to a non-aqueous electrolyte, and more particularly to an additive for a non-aqueous electrolyte of a secondary battery having a high dissolving power of a support salt and a low viscosity and a non-aqueous electrolyte secondary battery having excellent high-rate characteristics (quick discharge-charge characteristics).

BACKGROUND ART

At the present time, the majority of note-type personal computers, mobile telephones and the like are presently driven by a non-aqueous electrolyte secondary battery having a high voltage and a high energy density and showing an excellent self-discharge property. In this non-aqueous electrolyte secondary battery, carbon is frequently used as a material forming a negative electrode, and various organic solvents are used as an electrolyte for the purpose of reducing a risk when lithium is formed on a surface of the electrode and making a driving power high. Also, an alkali metal (particularly lithium metal or lithium alloy) or the like is used as a material for a negative electrode in a non-aqueous electrolyte secondary battery for a camera, so that an aprotic organic solvent, usually an ester based organic solvent or the like is used as an electrolyte.

These non-aqueous electrolyte secondary batteries are high in the performances, but have the following problems for the safety. Firstly, when the alkali metal (particularly lithium metal or lithium alloy) is used as the material for the negative electrode in the non-aqueous electrolyte secondary battery, since the alkali metal is very active for water, if the sealing of the battery is incomplete and water penetrates thereinto, there is a problem that a risk of generating hydrogen or firing is made high by reacting the material for the negative electrode with water. Also, since the lithium metal is low in the melting point (about 170° C.), there is a problem that if a large current violently flows in the short-circuiting or the like, the battery abnormally generates heat to cause an extremely risky state of fusing the battery or the like. Further, there is a problem that the electrolyte based on the organic solvent is vaporized and decomposed accompanied with the heat generation of the battery to generate a gas or the explosion and ignition of the battery are caused by the generated gas.

On the other hand, there are known a non-aqueous electrolyte secondary batteries in which a specified phosphazene derivative is added to the electrolyte to largely reduce the risk such as the ignition of the electrolyte or the like (see JP-A-6-13108 and JP-A-2002-83628). In these batteries, a self-extinguishing property or a flame retardance is given to the non-aqueous electrolyte by a nitrogen gas or a gas of phosphoric acid ester derived from the phosphazene derivative, whereby the risk of the ignition or the like is reduced. Also, phosphorus constituting the phosphazene derivative has an action of suppressing the chain decomposition of a high molecular weight material constituting the battery, so that the risk of the ignition or the like is effectively reduced.

However, cyclic phosphazene derivatives disclosed in JP-A-6-13108 and JP-A-2002-83628 are poor in the ability dissolving a support salt, so that when a greater amount of the cyclic phosphazene derivative is added to the electrolyte and a lithium salt is used as a support salt, an electric conductivity of lithium ion in the electrolyte is lowered to lower the electric conductivity and hence the quick discharge characteristic and quick charge characteristic of the battery are poor. Recently, a quick start (quick discharge) characteristic or an energy recovery (quick charge) characteristic in the braking is demanded in actively examined non-aqueous electrolyte secondary batteries for electric cars, so that the battery having the cyclic phosphazene derivative added to the electrolyte has a problem as a battery for the electric car. Also, such a tendency becomes conspicuous at a temperature lower than room temperature, so that there is a problem in the quick discharge and quick charge characteristics under a lower temperature environment.

On the other hand, chain phosphazene derivatives disclosed in JP-A-6-13108 and JP-A-2002-83628 are sufficient in the ability dissolving the support salt, but are somewhat higher in the viscosity as compared with the cyclic phosphazene derivative, so that when such a chain phosphazene derivative is added to the electrolyte, there is a tendency of lowering the electric conductivity of the battery. The lowering of the electric conductivity results in the lowering of the above quick discharge and quick charge characteristics, so that the battery having the chain phosphazene derivative added to the electrolyte has a problem in the quick discharge and quick charge characteristics.

DISCLOSURE OF THE INVENTION

It is, therefore, an object of the invention to solve the problems of the conventional techniques and to provide an additive for a non-aqueous electrolyte of a secondary battery having a high dissolving power of a support salt and a low viscosity and a non-aqueous electrolyte secondary battery containing this additive in a non-aqueous electrolyte and having excellent high-rate characteristics (quick discharge-charge characteristics).

The inventors have made various studies in order to achieve the above object, and found that a specified chain phosphazene derivatives has a low viscosity and a high ability of dissolving a support salt and that when such a phosphazene derivative is added to an electrolyte of a non-aqueous electrolyte secondary battery, the quick discharge characteristic and quick charge characteristic of this battery are improved, and as a result, the invention has been accomplished.

That is, the additive for a non-aqueous electrolyte of a secondary battery according to the invention is characterized by comprising a phosphazene derivative represented by the following formula (I):

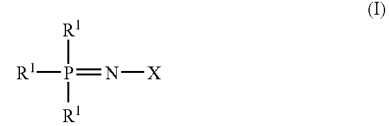

wherein $R^1$ is independently a halogen element or a monovalent substituent; and X is an organic group containing at least one element selected from the group consisting of carbon, silicon, nitrogen, phosphorus, oxygen and sulfur).

In a preferable embodiment of the additive for the non-aqueous electrolyte of the secondary battery according to the invention, at least one of $R^1$s in the formula (I) is a halogen. As the halogen, fluorine is particularly preferable.

In another preferable embodiment of the additive for the non-aqueous electrolyte of the secondary battery according to the invention, $R^1$ in the formula (I) is any one of an alkoxy group, a phenoxy group, an alkyl group, an aryl group, an acyl group, an amino group, an alkylthio group and an arylthio group.

In the other preferable embodiment of the additive for the non-aqueous electrolyte of the secondary battery according to the invention, X in the formula (I) is represented by any one of the following formulae (IA), (IB), (IC), (ID) and (IE):

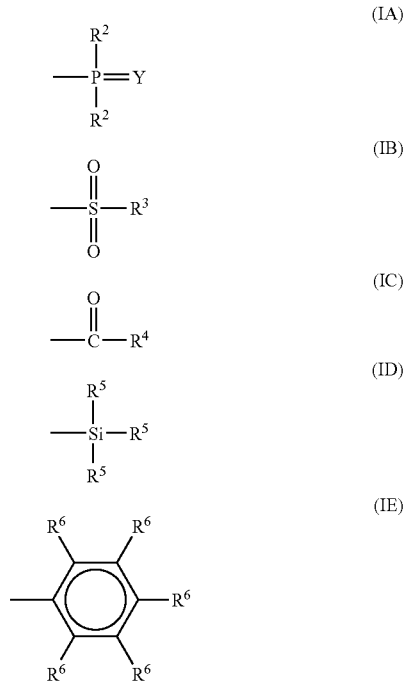

(in the formulae (IA), (IB), (IC), (ID) and (IE), $R^2$, $R^3$, $R^4$, $R^5$ and $R^6$ are independently a halogen element or a monovalent substituent; and Y is an organic group containing at least one element selected from the group consisting of oxygen, sulfur, carbon, silicon, nitrogen and phosphorus).

Also, the non-aqueous electrolyte secondary battery according to the invention is characterized by comprising a non-aqueous electrolyte containing the above additive for the non-aqueous electrolyte of the secondary battery and a support salt, a positive electrode, and a negative electrode.

In a preferable embodiment of the non-aqueous electrolyte secondary battery according to the invention, a content of the phosphazene derivative in the non-aqueous electrolyte is not less than 1 volume %. At the moment, the content of the phosphazene derivative in the non-aqueous electrolyte is preferably not less than 2 volume % from a viewpoint of the prevention of deterioration of support salt, further preferably not less than 5 volume % from a viewpoint of the application of flame retardance to the electrolyte, particularly preferably not less than 10 volume % from a viewpoint of the application of incombustibility to the electrolyte.

BEST MODE FOR CARRYING OUT THE INVENTION

The invention will be described in detail below.

<Additive for Non-Aqueous Electrolyte of Secondary Battery>

The additive for the non-aqueous electrolyte of the secondary battery according to the invention comprises a phosphazene derivative represented by the formula (I). This phosphazene derivative is high in the dielectric constant and high in the ability dissolving the support salt because it is a chain structure. Also, a compound in which a halogen having a high electronegativity is directly bonded to phosphorus or sulfur is very low in the viscosity. For this end, the non-aqueous electrolyte containing such a phosphazene derivative is high in the ionic conductivity, and also the non-aqueous electrolyte secondary battery using such a non-aqueous electrolyte is excellent in the quick charge characteristic and quick discharge characteristic.

Further, when the above phosphazene derivative is included into the conventional non-aqueous electrolyte, it is possible to give an excellent safety to the non-aqueous electrolyte battery and reduce the risk of ignition or the like under an action of nitrogen gas and phosphoric acid ester derived from the phosphazene derivative. Also, since phosphorus has an action of suppressing the chain decomposition of the high molecular weight material constituting the battery, the safety of the battery can be improved effectively.

Moreover, it is considered in the conventional non-aqueous electrolyte secondary battery that a lithium ion source or the like such as $LiPF_6$ or the like as a support salt in an ester based electrolyte used as the electrolyte is decomposed into LiF and $PF_5$ with the lapse of time to generate $PF_5$ gas, or the resulting $PF_5$ gas further reacts with water or the like to generate a hydrogen fluoride gas or the like, whereby the electrode material is corroded and deteriorated. That is, the electric conductivity of the non-aqueous electrolyte lowers but also a phenomenon of deteriorating the electrode material through the resulting hydrogen fluoride gas is caused. On the contrary, the phosphazene derivative suppresses the decomposition of the lithium ion source such as $LiPF_6$ or the like and contributes to the stabilization thereof. Therefore, it is possible to suppress the decomposition reaction in the non-aqueous electrolyte and control the corrosion and deterioration by adding the phosphazene derivative to the conventional non-aqueous electrolyte.

The viscosity of the phosphazene derivative represented by the formula (I) is not particularly limited as long as it is not more than 4.5 mPa·s (cP), but it is preferably not more than 3.8 mPa·s (cP), more preferably not more than 2.9 mPa·s (cP) from a viewpoint of the improvement of the electric conduction and the improvement of low temperature characteristics. In the invention, the viscosity is determined by using a viscosity measuring device (R-type viscometer Model RE500-SL, made by Toki Sangyo Co., Ltd.) and conducting the measurement at each revolution rate of 1 rpm, 2 rpm, 3 rpm, 5 rpm, 7 rpm, 10 rpm, 20 rpm and 50 rpm for 120 seconds to measure a viscosity under the revolution rate when an indication value is 50-60% as an analytical condition.

The saturated dissolving amount of the support salt in the phosphazene derivative of the formula (I) is 1.5-2.5 mol per 1000 mL of the phosphazene derivative, for example, when the support salt is $LiPF_6$, and is preferable to be not less than 2.0 mol from a viewpoint of more preferably improving the electric conduction and low temperature characteristics.

In the formula (I), $R^1$ is independently a halogen element or a monovalent substituent. As the halogen element, fluorine, chlorine, bromine and the like are preferable, and among them, fluorine is particularly preferable in a point that the viscosity is low. As the monovalent substituent are mentioned an alkoxy group, a phenoxy group, an alkyl group, an aryl group, an acyl group, an amino group, an alkylthio group, an arylthio group and the like. Among them, the alkoxy group, phenoxy group and amino group are preferable in a point that the preparation is easy.

As the alkoxy group are mentioned methoxy group, ethoxy group, propoxy group, butoxy group, an allyloxy group having a double bond, and an alkoxy-substituted alkoxy group such as methoxyethoxy group, methoxyethoxyethoxy group or the like. As the phenoxy group are mentioned phenoxy group, methylphenoxy group, methoxyphenoxy group and the like. As the alkyl group are mentioned methyl group, ethyl group, propyl group, butyl group, pentyl group and the like. As the acyl group are mentioned formyl group, acetyl group, propionyl group, butyryl group, isobutyryl group, valelyl group and the like. As the aryl group are mentioned phenyl group, tolyl group, naphthyl group and the like. As the amino group are mentioned amino group, methylamino group, dimethylamino group, ethylamino group, diethylamino group, aziridyl group, pyrrolidyl group and the like. As the alkylthio group are mentioned methylthio group, ethylthio group, phenylthio group and the like. As the arylthio group are mentioned phenylthio group, tolylthio group, naphthylthio group and the like.

A hydrogen element in the monovalent substituent may be substituted with a halogen element. In the formula (I), all of $R^1$s may be the same kind of the substituent, or some of them may be different substituents. Particularly, a case that at least one of $R^1$s is a halogen is preferable in a point that the flame retardance is improved, and further a case that the halogen is fluorine is particularly preferable in a point that the viscosity is low.

In the formula (I), X is preferable to be an organic group having a structure represented by any one of the formulae (IA)-(IE). In the formulae (IA)-(IE), $R^2$-$R^6$ are independently a halogen element or a monovalent substituent. As $R^2$-$R^6$ are preferably mentioned the same halogen elements and monovalent substituents as described in $R^1$ of the formula (I). $R^2$, $R^5$ and $R^6$ may be the same or different in the same organic group, or may be bonded to each other to form a ring. As Y are mentioned, for example, NR group (R is an alkyl group, an alkoxyl group, a phenyl group or the like, which is so forth on), and elements such as oxygen, sulfur, carbon, phosphorus, silicon and the like, and among them, NR group, oxygen and sulfur are preferable.

<Non-Aqueous Electrolyte Secondary Battery>

The non-aqueous electrolyte secondary battery according to the invention comprises a non-aqueous electrolyte containing the aforementioned additive for the non-aqueous electrolyte of the secondary battery and a support salt, a positive electrode and a negative electrode. As the support salt contained in the non-aqueous electrolyte is preferable a support salt being an ion source for lithium ion or the like. The ion source for lithium ion is not particularly limited, but it preferably includes lithium salts such as $LiClO_4$, $LiBF_4$, $LiPF_6$, $LiCF_3SO_3$, $LiAsF_6$, $LiC_4F_9SO_3$, $Li(CF_3SO_2)_2N$, $Li(C_2F_5SO_2)_2N$ and the like. They may be used alone or in a combination of two or more.

Since the phosphazene derivative represented by the formula (I) is high in the ability dissolving the support salt as mentioned above, an amount of the support salt larger than the conventional one can be dissolved in the electrolyte containing the phosphazene derivative, and hence the electric conductivity of lithium ion in the electrolyte is improved. Therefore, the non-aqueous electrolyte secondary battery of the invention using the above electrolyte is high in the electric conductivity and excellent in the quick discharge characteristic and quick charge characteristic.

The amount of the support salt compounded to the non-aqueous electrolyte is preferably 0.2-1 mol, more preferably 0.5-1 mol per 1 L of the non-aqueous electrolyte (solvent component). When the amount is less than 0.2 mol, the sufficient electric conduction of the non-aqueous electrolyte can not be ensured and troubles may be caused in the charge-discharge characteristics of the battery, while when it exceeds 1 mol, the viscosity of the non-aqueous electrolyte rises and the sufficient mobility of the lithium ion or the like can not be ensured, and hence the sufficient electric conduction of the non-aqueous electrolyte can not be ensured and troubles may be caused in the charge-discharge characteristics of the battery.

The electrolyte for the non-aqueous electrolyte secondary battery according to the invention may contain an aprotic organic solvent in addition to the support salt and the phosphazene derivative of the formula (I). It is preferable to include the aprotic organic solvent in the electrolyte from a viewpoint of the safety. That is, when the aprotic organic solvent is included in the electrolyte, a high safety can be obtained without reacting with a material for a negative electrode mentioned later. Also, it is possible to make the viscosity of the electrolyte low, and an optimum ion conduction as a non-aqueous electrolyte secondary battery can be easily attained.

The aprotic organic solvent is not particularly limited, but includes ether compounds, ester compounds and the like in a point that the viscosity of the electrolyte is made low. Concretely, there are preferably mentioned 1,2-dimethoxyethane, tetrahydrofuran, dimethyl carbonate, diethyl carbonate, diphenyl carbonate, ethylene carbonate, propylene carbonate, γ-butyrolactone, γ-valerolactone, methylethyl carbonate and the like. Among them, cyclic ester compounds such as ethylene carbonate, propylene carbonate, γ-butyrolactone and the like; chain ester compounds such as dimethyl carbonate, ethylmethyl carbonate, diethyl carbonate and the like; and chain ether compounds such as 1,2-dimethoxyethane and the like are preferable. Particularly, the cyclic ester compound is preferable in a point that the dielectric constant is high and the solubility of lithium salt or the like is excellent, and the chain ester and ether compounds are preferable in a point that the viscosity is low and the viscosity of the electrolyte is made low. They may be used alone or in a combination of two or more, but the combination of two or more is preferable. The viscosity at 25° C. of the aprotic organic solvent is not particularly limited, but it is preferably not more than 10 mPa·s (cP), more preferably not more than 5 mPa·s (cP).

The viscosity at 25° C. of the electrolyte in the non-aqueous electrolyte secondary battery according to the invention is preferably 1.0-6.0 mPa·s (cP), further preferably 1.0-3.3 mPa·s (cP). Since the electrolyte contains the above phosphazene derivative, the viscosity is low, and hence the non-aqueous electrolyte secondary battery according to the invention using such an electrolyte is high in the electric conductivity and excellent in the quick discharge characteristic and quick charge characteristic.

The content of the phosphazene derivative in the electrolyte of the non-aqueous electrolyte secondary battery according to the invention is preferable to be not less than 1.0 volume % from a viewpoint that the high-rate characteristics (quick charge-discharge characteristics) of the non-aqueous electrolyte secondary battery are preferably improved. When the content of the phosphazene derivative is within the above numerical range, the high-rate characteristics of the battery can be preferably improved.

The content of the phosphazene derivative in the electrolyte of the non-aqueous electrolyte secondary battery according to the invention is preferable to be not less than 2 volume % from a viewpoint that "resistance to deterioration" can be preferably given to the electro-lyte. When the content of the phosphazene derivative is within the above numerical range, the deterioration can be preferably suppressed. In this case, the "deterioration" means the decomposition of the support salt (e.g. lithium salt), and the effect of preventing the deterioration is evaluated by the following method of evaluating the stability.

Stability Evaluating Method (1) After the preparation of the non-aqueous electrolyte containing the support salt, the water content is firstly measured. Then, the concentration of hydrogen fluoride in the non-aqueous electrolyte is measured by a high-speed liquid chromatography (ion chromatography). Further, the color tone of the non-aqueous electrolyte is visually observed, and thereafter the discharge capacity is calculated by a discharge test.

(2) After the non-aqueous electrolyte is left to stand in a globe box for 2 months, the water content and concentration of hydrogen fluoride are again measured, and the color tone is observed, and the discharge capacity is calculated. The stability is evaluated by the change of these measured results.

Also, the content of the phosphazene derivative in the electrolyte of the non-aqueous electrolyte secondary battery according to the invention is preferable to be not less than 5 volume % from a viewpoint that "flame retardance" is given to the electrolyte. Further, the content is preferable to be not less than 10 volume % from a viewpoint that "incombustibility" is given to the electrolyte. When the content of the phosphazene derivative is not less than 5 volume %, the electrolyte becomes flame retardant, while when it is not less than 10 volume %, the electrolyte becomes incombustible. At this moment, the flame retardance and incombustibility are defined by a method according to UL94HB method. In this case, when a test piece of 127 mm×12.7 mm is prepared by penetrating 1.0 mL of the electrolytes into a non-combustible quartz fiber and then the test piece is ignited under an atmosphere environment, a case that the ignited flame does not arrive at a line of 25 mm of the device and the ignition is not observed in the falling object is the flame retardance, and a case that the ignition is not caused (combustion length: 0 mm) is the incombustibility. In the invention, the flame retardance and incombustibility are evaluated by measuring an oxygen index according to JIS K7201.

At this moment, the oxygen index means a value of lowest oxygen concentration represented by a volume percentage required for continuing the combustion of the material under given test conditions defined in JIS K7201. As the oxygen index becomes low, the risk of firing-ignition is high, while as the oxygen index becomes high, the risk of firing-ignition is low, which means that "the safety is high". Under the atmosphere condition, the oxygen index corresponds to 20.2 volume %, so that the electrolyte having an oxygen index of 20.2 volume % means that it burns in the atmosphere. As a result of the inventors' examination, it is confirmed that the electrolyte having an oxygen index of not less than 23 volume % has the flame retardance defined by the method according to the UL94HB method and the electrolyte having an oxygen index of not less than 25 volume % has the incombustibility defined by the method according to the UL94HB method, so that the flame retardance and incombustibility are evaluated by the measurement of the oxygen index in the invention.

The material for the positive electrode constituting the non-aqueous electrolyte secondary battery according to the invention is not particularly limited, but can be properly selected and used from the well-known positive electrode materials. For example, there are preferably mentioned a metal oxide such as $V_2O_5$, $V_6O_{13}$, $MnO_2$, $MnO_3$ or the like, a lithium-containing composite oxide such as $LiCoO_2$, $LiNiO_2$, $LiMn_2O_4$, $LiFeO_2$, $LiFePO_4$ or the like, a metal sulfide such as $TiS_2$, $MoS_2$ or the like, an electrically conductive polymer such as polyaniline or the like, and so on. The lithium-containing composite oxide may be a composite oxide containing two or three transition metals selected from the group consisting of Fe, Mn, Co and Ni. In the latter case, the composite oxide is represented by $LiFe_xCo_yNi_{(1-x-y)}O_2$ (wherein $0 \leqq x<1$, $0 \leqq y<1$, $0<x+y \leqq 1$), $LiMn_xFe_yO_{2-x-y}$, or the like. Among them, $LiCoO_2$, $LiNiO_2$, $LiMn_2O_4$ are particularly preferable in points that the capacity is high and the safety is high and further the wettability of the electrolyte is excellent. These materials may be used alone or in a combination of two or more. Also, the positive electrode material may be properly added with an electric conductive agent such as acetylene black or the like, and a bonding agent such as polyvinylidene fluoride (PVDF), polytetrafluoroethylene (PTFE) or the like. The shape of the positive electrode is not particularly limited, and can be properly selected from the well-known shapes as an electrode. For example, there are mentioned sheet, cylindrical column, plate, spiral shape and the like.

The material for the negative electrode is not particularly limited as long as it can absorb or discharge lithium or lithium ion, and can be properly selected from the well-known ones. For example, there are preferably mentioned a lithium-containing material, concretely lithium metal itself, an alloy of lithium with aluminum, indium, lead, zinc or the like, a carbon material such as graphite doped with lithium or the like, and so on. Among them, the carbon material such as graphite or the like is preferable in a point that the safety is higher. These materials may be used alone or in a combination of two or more. The shape of the negative electrode is not particularly limited, and can be properly selected from the well-known shapes likewise the shape of the positive electrode.

The non-aqueous electrolyte secondary battery according to the invention is preferable to comprise a separator interposed between the positive and negative electrodes for preventing the short-circuiting of current due to the contact of both the electrodes in addition to the positive electrode, negative electrode and the electrolyte. As a material of the separator are preferably mentioned materials surely preventing the contact of both the electrodes and passing or impregnating the electrolyte such as non-woven fabrics, thin layer films and the like made of synthetic resin such as polytetrafluoroethylene, poly-propylene, polyethylene or the like. Among them, a microporous film of polypropylene or polyethylene having a thickness of about 20-50 μm is particularly preferable. The non-aqueous electrolyte secondary battery according to the invention may be provided with well-known members usually used in the battery in addition to the separator.

The shape of the non-aqueous electrolyte secondary battery according to the invention is not particularly limited, but there are preferably mentioned various known shapes such as cylindrical batteries of coin type, button type, paper type, square or spiral structure and the like. In case of the spiral structure, the non-aqueous electrolyte secondary battery can be prepared by preparing sheet-shaped positive electrodes, sandwiching a current collector therebetween, piling a negative electrode (sheet-shaped) thereon and winding up them or the like.

As a capacity of the non-aqueous electrolyte secondary battery, when the positive electrode is $LiCoO_2$, the charge-discharge capacity is preferably 140-145 (mAh/g), more preferably 143-145 (mAh/g). Moreover, the charge-discharge capacity can be measured by the well-known measuring method, for example, a method wherein charge-discharge test is carried out by using a semi-open type cell or a closed type coin cell (see Masayuki Yoshio, *Lithium Ion Secondary Battery*, published by Nikkan Kogyo Shinbun-sha) to measure a capacity from charge current (mA), time (t) and mass of electrode material (g).

In the non-aqueous electrolyte secondary battery according to the invention, the electric conductivity (specific conductance) of the electrolyte is not less than 6.0 mS/cm, preferably not less than 7.0 mS/cm as an electric conductivity of a lithium salt solution having a concentration of 0.75 mol/L. The non-aqueous electrolyte secondary battery according to the invention is excellent in the high-rate characteristics (quick charge-discharge characteristics) because the electric conductivity is higher than that of the conventional one as mentioned above. Moreover, the electric conductivity is measured by the following measurement method.

Method of Measuring Electric Conductivity

The electric conductivity is measured by using an electric conductivity meter (trade name: CDM210 Model, made by Radiometer Trading Co., Ltd.) under given conditions (temperature: 25° C., pressure: atmospheric pressure, water content: not more than 10 ppm) while applying a constant current of 5 mA to the battery. Moreover, the electric conductivity $K=G·K$ (S/cm) is theoretically determined by measuring a conductance (Gm) of the electrolyte, removing an influence of cable resistance (R) therefrom to measure a conductance (G) of the electrolyte itself and calculating from the resulting (G) and a known cell constant (K).

The following examples are given in illustration of the invention and are not intended as limitations thereof.

EXAMPLES

Using phosphazene derivatives shown in Table 1, the saturated dissolving amount of $LiPF_6$ (support salt) and viscosity are measured. The results are shown in Table 1. In Table 1, phosphazene A is a compound shown by the following formula (A), and phosphazene B is a compound shown by the following formula (B), and phosphazene C is a compound shown by the following formula (C), and phosphazene D is a compound shown by the following formula (D), which are synthesized by the following methods.

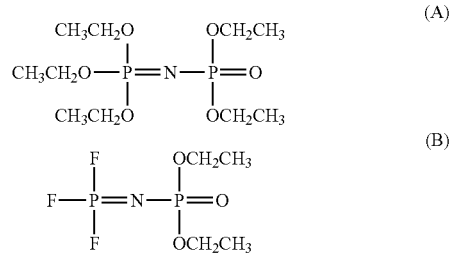

(A)

(B)

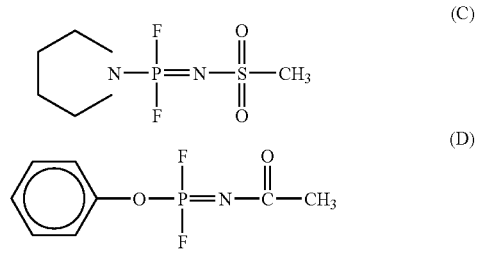

(C)

(D)

(Synthesis of Phosphazene Derivative A)

A compound of the formulas (I), in which X is represented by the formula (IA) and all of $R^1$s and $R^2$s are Cl and Y is oxygen, is reacted with sodium ethoxide in a toluene solvent at a temperature of −40° C. and subjected to a molecular distillation to obtain a purified phosphazene derivative A.

(Synthesis of Phosphazene Derivative B)

Phosphorus trifluoride dichloride ($PCl_2F_3$) is reacted with diethyl phosphorylamide in the absence of a solvent at room temperature and subjected to a molecular distillation to obtain a purified phosphazene derivative B.

(Synthesis of Phosphazene Derivative C)

Phosphorus trifluoride dichloride ($PCl_2F_3$) is reacted with methane sulfonamide in the absence of a solvent at room temperature to obtain a compound of the formula (I) in which X is represented by the formula (IB) and all of $R^1$s are fluorine and $R^3$ is methyl group. Then, this compound is reacted with pyrrolidine in a toluene solvent at room temperature and subjected to a molecular distillation to obtain a purified phosphazene derivative C.

(Synthesis of Phosphazene Derivative D)

Phosphorus trifluoride dichloride ($PCl_2F_3$) is reacted with acetoamide in the absence of a solvent at room temperature to obtain a compound of the formula (I) in which X is represented by the formula (IC) and all of $R^1$s are fluorine and $R^4$ is methyl group. Then, this compound is added with sodium phenoxide in an acetonitrile solvent at a temperature of −40° C. and subjected to a molecular distillation to obtain a purified phosphazene derivative D.

TABLE 1

| | Saturated dissolving amount (mol/L) | Viscosity (mPa · s) |
|---|---|---|
| Phosphazene A | not less than 1.5 | 5.8 |
| Phosphazene B | not less than 2.0 | 3.8 |
| Phosphazene C | not less than 2.0 | 3.3 |
| Phosphazene D | not less than 2.0 | 2.9 |

As seen from Table 1, the phosphazene derivatives represented by the formula (I) are excellent in the ability dissolving the support salt and low in the viscosity as compared with the conventionally used phosphazene derivative A.

Next, an electrolyte is prepared according to a compounding recipe shown in Table 2, and the viscosity of the electrolyte is measured and the oxygen index thereof is measured by the following method.

Method of Measuring Oxygen Index

The limit oxygen index is measured according to JIS K7201. A test specimen is prepared by reinforcing a $SiO_2$ sheet (quartz filter paper, incombustible) of 127 mm×12.7 mm with a U-shaped aluminum foil so as to render into self-standing posture and impregnating 1.0 mL of the electrolyte into the $SiO_2$ sheet. This test specimen is vertically attached to a supporter for the test specimen so as to position at a distance of not less than 100 mm separated from an upper end portion of a combustion cylinder (inner diameter of 75 mm, height of 450 mm, equally filled with glass particles of 4 mm in diameter over a region ranging from the bottom to 100±5 mm, a metal net placed thereon). Then, oxygen (equal to or more than JIS K1101) and nitrogen (equal to or more than Grade 2 of JIS K1107) are flown into the combustion cylinder, while the test specimen is ignited in air (heat source is Class 1, No. 1 of JIS K2240) to examine a combustion state. Moreover, the total flowing amount in the combustion cylinder is 11.4 L/min. This test is repeated 3 times, and an average value thereof is determined.

At this moment, the oxygen index means a value of lowest oxygen concentration represented by volume percentage required for continuing the combustion of the material under given test conditions defined according to JIS K7201. In the invention, the limit oxygen index is calculated from a lowest oxygen flowing amount required for continuously burning the test specimen for not less than 3 minutes or continuing the combustion length of not less than 50 mm after the ignition and a nitrogen flowing amount at the time. Equation: Oxygen index=(oxygen flowing amount)/([oxygen flowing amount]+[nitrogen flowing amount])×100 (volume %)

A non-aqueous electrolyte secondary battery is prepared by using the above electrolyte by the following method. With respect to the resulting battery, the initial battery characteristics at 20° C. (voltage, internal resistance) and electric conductivity are measured, and thereafter the cycle characteristic, low temperature characteristic and resistance to deterioration are measured and evaluated by the following evaluation method. These results are shown in Tables 2 and 3.

(Preparation of Non-Aqueous Electrolyte Secondary Battery)

A cobalt oxide shown by a chemical formula of $LiCoO_2$ is used as an active substance of a positive electrode and 10 parts of acetylene black (electrically conductive assistant) and 10 parts of teflon (R) binder (binding resin) are added to 100 parts of $LiCoO_2$ and kneaded with an organic solvent (mixed solvent of 50/50 mass % of ethyl acetate and ethanol), which is rolled through rolls to prepare a thin-layer positive electrode sheet of 100 μm in thickness and 40 mm in width. Thereafter, the resulting two positive electrode sheets are used, and an aluminum foil (current collector) coated on its surface with an electrically conductive adhesive and having a thickness of 25 μm is sandwiched therebetween, and a lithium foil having a thickness of 150 μm is piled thereon through a separator of 20 μm in thickness (microporous film made of polypropylene), which are wound up to prepare cylinder type electrodes. The length of the positive electrode in the cylinder type electrodes is about 260 mm. Into the cylinder type electrodes is poured the electrolyte and then the sealing is conducted to prepare a size AA lithium battery (non-aqueous electrolyte secondary battery).

Evaluation of Charge-Discharge Cycle Characteristics

The charge-discharge are repeated up to 50 cycles under conditions that an upper limit voltage is 4.5 V and a lower limit voltage is 3.0 V and a discharge current is 100 mA and a charge current is 50 mA and a temperature at the discharge is 20° C. The charge-discharge capacity at this time is compared with the initial charge-discharge capacity to calculate a reducing ratio of the capacity after 50 cycles. With respect to three batteries in total, the same measurement and calculation are conducted to evaluate the charge-discharge cycle characteristics (long-period stability of non-aqueous electrolyte) by an average value thereof.

Evaluation of Low Temperature Characteristics (Measurement of Discharge Capacity at Low Temperature)

With respect to the resulting battery, the charge-discharge are repeated up to 50 cycles under the same conditions as in the above "evaluation of charge-discharge cycle characteristics" except that the temperature at the discharge is made low (−10° C.). The discharge capacity at this low temperature is compared with the discharge capacity measured at 20° C. to calculate the residual ratio of discharge capacity by the following equation. With respect to three batteries in total, the same measurement and evaluation are conducted, and the low temperature characteristics are evaluated by an average value thereof. Equation: residual ratio of discharge capacity=[discharge capacity at low temperature (−10° C.)/discharge capacity (20° C.)]×100 (%)

Evaluation of Resistance to Deterioration

With respect to the resulting non-aqueous electrolyte, the resistance to deterioration is evaluated by measuring and calculating water content (ppm), concentration of hydrogen fluoride (ppm) and charge-discharge capacity (mAh/g) just after the preparation of the non-aqueous electrolyte and after being left to stand in a globe box for 2 months in the same manner as in the above method of evaluating the stability. In this case, the charge-discharge capacity (mAh/g) is determined by measuring charge-discharge curve using the positive electrode or negative electrode with a known weight and dividing the resulting charge quantity and discharge quantity by the weight of the electrode used. Also, the change of color tone in the non-aqueous electrolyte is visually observed just after the preparation of the non-aqueous electrolyte and after being left to stand in the globe box for 2 months.

TABLE 2

| | Electrolyte | | | | | | | | Cycle characteristic | | Low temperature characteristic |
| | Aprotic organic solvent (volume %) | Phosphazene (volume %) | Support salt (mol/L) | Viscosity (mPa·s) | Oxygen index (volume %) | Initial potential (V) | Internal resistance (Ω) | Electric conductivity (mS/cm) | Initial charge-discharge capacity (mAh/g) | Charge-discharge capacity after 50 cycles (mAh/g) | Residual ratio of discharge capacity (%) |
|---|---|---|---|---|---|---|---|---|---|---|---|
| Conventional Example | DEC *1 45 EC *2 45 | phosphazene A 10 | LiPF$_6$ 0.75 | 3.3 | 21.0 | 2.8 | 0.12 | 6.0 | 142 | 141 | 56 |
| Example 1 | DEC 45 EC 45 | phosphazene B 10 | LiPF$_6$ 0.75 | 3.1 | 22.8 | 2.6 | 0.09 | 6.8 | 142 | 141 | 60 |

TABLE 2-continued

| | Electrolyte | | | | | | | | Cycle characteristic | | Low temperature characteristic |
| | Aprotic organic solvent (volume %) | Phosphazene (volume %) | Support salt (mol/L) | Viscosity (mPa·s) | Oxygen index (volume %) | Initial potential (V) | Internal resistance (Ω) | Electric conductivity (mS/cm) | Initial charge-discharge capacity (mAh/g) | Charge-discharge capacity after 50 cycles (mAh/g) | Residual ratio of discharge capacity (%) |
|---|---|---|---|---|---|---|---|---|---|---|---|
| Example 2 | DEC 45 | EC 45 | phosphazene C 10 | LiPF$_6$ 0.75 | 3.0 | 24.0 | 2.6 | 0.08 | 7.0 | 142 | 141 | 60 |
| Example 3 | DEC 45 | EC 45 | phosphazene D 10 | LiPF$_6$ 0.75 | 2.9 | 23.0 | 2.6 | 0.07 | 7.2 | 142 | 142 | 62 |

*1 diethyl carbonate
*2 ethylene carbonate

TABLE 3

| | Evaluation of resistance to deterioration | | | | | | | |
| | Initial | | | After being left to stand for 2 months | | | | |
| | Recharge-discharge capacity (mAh/g) | HF concentration (ppm) | Water content (ppm) | Recharge-discharge capacity (mAh/g) | HF concentration (ppm) | Water content (ppm) | Change of color tone | Evaluation |
|---|---|---|---|---|---|---|---|---|
| Conventional Example | 142 | 1 | 2 | 139 | 1 | 2 | none | ○: good |
| Example 1 | 142 | 1 | 2 | 140 | 1 | 2 | none | ○: good |
| Example 2 | 142 | 1 | 1 | 140 | 1 | 1 | none | ○: good |
| Example 3 | 142 | 1 | 2 | 140 | 1 | 2 | none | ○: good |

As seen from table 2, the electrolyte in the non-aqueous electrolyte secondary battery according to the invention is low in the viscosity as compared with the conventional electrolyte, and the non-aqueous electrolyte secondary battery according to the invention using this electrolyte is high in the electric conductivity as compared with the conventional battery. As a result, the non-aqueous electrolyte secondary battery according to the invention is excellent in the quick charge characteristic and the quick discharge characteristic. Also, the characteristics as a secondary battery and the resistance to deterioration in the non-aqueous electrolyte secondary battery according to the invention are equal to or more than those of the conventional battery. Particularly, the non-aqueous electrolyte secondary battery according to the invention is high in the residual ratio of discharge capacity at low temperature and excellent in the low temperature characteristics because the electric conductivity is high. Further, in the electrolyte of the non-aqueous electrolyte secondary battery according to the invention, the oxygen index is high and the safety of the electrolyte is high.

INDUSTRIAL APPLICABILITY

According to the invention, there can be provided an additive for a non-aqueous electrolyte of a secondary battery having a high ability dissolving a support salt and a low viscosity. Also, the non-aqueous electrolyte secondary battery according to the invention obtained by adding this additive to the electrolyte is high in the electric conductivity and excellent in the quick discharge characteristic and the quick charge characteristic.

The invention claimed is:

1. A non-aqueous electrolyte of a secondary battery comprising an additive characterized by comprising a phosphazene derivative represented by the following formula (I):

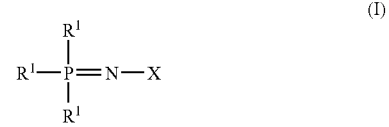

(wherein $R^1$ is independently a halogen element or a monovalent substituent; and X is an organic group containing at least one element selected from the group consisting of carbon, silicon, nitrogen, phosphorus, oxygen and sulfur), wherein at least one of $R^1$s in the formula (I) is fluorine.

2. A non-aqueous electrolyte of a secondary battery according to claim 1, wherein $R^1$ in the formula (I) is any one of an alkoxy group, a phenoxy group, an alkyl group, an aryl group, an acyl group, an amino group, an alkylthio group and an arylthio group.

3. A non-aqueous electrolyte of a secondary battery according to claim 1, wherein X in the formula (I) is represented by any one of the following formulae (IA), (IB), (IC), (ID) and (IE):

(IA)
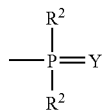

(IB)
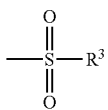

(IC)
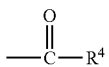

(ID)
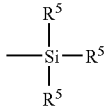

(IE)
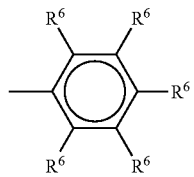

(in the formulae (IA), (IB), (IC), (ID) and (IE), $R^2$, $R^3$, $R^4$, $R^5$ and $R^6$ are independently a halogen element or a monovalent substituent; and Y is oxygen, sulfur, or an organic group containing at least one element selected from the group consisting of oxygen, sulfur, carbon, silicon, nitrogen and phosphorus).

4. A non-aqueous electrolyte secondary battery comprising a non-aqueous electrolyte containing an additive for a non-aqueous electrolyte of a secondary battery as claimed in any one of claims 1, or 3 and a support salt, a positive electrode, and a negative electrode.

5. A non-aqueous electrolyte secondary battery according to claim 4, wherein a content of the phosphazene derivative in the non-aqueous electrolyte is not less than 1 volume %.

6. A non-aqueous electrolyte secondary battery according to claim 5, wherein the content of the phosphazene derivative in the non-aqueous electrolyte is not less than 2 volume %.

7. A non-aqueous electrolyte secondary battery according to claim 6, wherein the content of the phosphazene derivative in the non-aqueous electrolyte is not less than 5 volume %.

8. A non-aqueous electrolyte secondary battery according to claim 7, wherein the content of the phosphazene derivative in the non-aqueous electrolyte is not less than 10 volume %.

* * * * *